US012637338B2

(12) United States Patent
Tracy et al.

(10) Patent No.: US 12,637,338 B2
(45) Date of Patent: May 26, 2026

(54) LOAD POSITION VERIFICATION SYSTEMS AND METHODS

(71) Applicant: The Raymond Corporation, Greene, NY (US)

(72) Inventors: Erik C. Tracy, Johnson City, NY (US); Joseph A. Weiss, Greene, NY (US); Curtis D. Richards, Greene, NY (US)

(73) Assignee: The Raymond Corporation, Greene, NY (US)

( * ) Notice: Subject to any disclaimer, the term of this patent is extended or adjusted under 35 U.S.C. 154(b) by 121 days.

(21) Appl. No.: 18/605,601

(22) Filed: Mar. 14, 2024

(65) Prior Publication Data

US 2024/0308828 A1 Sep. 19, 2024

Related U.S. Application Data

(60) Provisional application No. 63/452,589, filed on Mar. 16, 2023.

(51) Int. Cl.
*B66F 9/075* (2006.01)

(52) U.S. Cl.
CPC .................................. *B66F 9/0755* (2013.01)

(58) Field of Classification Search
CPC ..................................................... B66F 9/0755
(Continued)

(56) References Cited

U.S. PATENT DOCUMENTS 5,421,137 A * 6/1995 Stimpfl ................ A22C 11/006 53/236
7,699,141 B2 4/2010 Fossier et al.
(Continued)

FOREIGN PATENT DOCUMENTS

DE 3801133 A1 * 7/1989 ............ B66F 9/0755
JP 3304749 B2 7/2002
(Continued)

OTHER PUBLICATIONS

T. Muthuramalingam, M. M. Rabik, D. Saravanakumar and K. Jaswanth, “Sensor Integration-Based Approach for Automatic Fork Lift Trucks,” Jan. 15, 15, 2018, IEEE Sensors Journal, vol. 18, No. 2, pp. 736-740, https://ieeexplore.ieee.org/document/8119939 ( Year: 2018).*

(Continued)

*Primary Examiner* — Matthias S Weisfeld
*Assistant Examiner* — Hyang Ahn
(74) *Attorney, Agent, or Firm* — Quarles & Brady LLP

(57) ABSTRACT

A load position verification system for detecting a load on a pair of forks of a material handling vehicle. The system includes a first arm extending parallel with a first fork of the material handling vehicle and a second arm, opposite the first arm, extending parallel with a second fork of the material handling vehicle. In one example, the system includes one or more sensors, each sensor having a transmitter configured to transmit a beam and a receiver configured to receive the beam, positioned within the arms. In one example, the system may indicate that no load is on the forks when the receiver receives the beam from the transmitter. In another example, the system may indicate that a load is on the forks when the receiver does not receive the beam from the transmitter.

19 Claims, 13 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 10,048,398 | B2 | 8/2018 | Rose et al. | |
| 10,202,267 | B2 | 2/2019 | Weiss et al. | |
| 10,968,051 | B1 * | 4/2021 | Tomasetta | B25J 9/0024 |
| 11,565,921 | B2 | 1/2023 | Sperlich et al. | |
| 2008/0011554 | A1 | 1/2008 | Broesel et al. | |
| 2017/0121159 | A1 * | 5/2017 | Weiss | B62B 3/06 |
| 2017/0285643 | A1 * | 10/2017 | Ichinose | G05D 1/021 |
| 2022/0185601 | A1 * | 6/2022 | Kirchmayr | B65G 65/005 |

FOREIGN PATENT DOCUMENTS

| | | | | |
|---|---|---|---|---|
| JP | 2003267692 | A | * | 9/2003 |
| JP | 4114242 | B2 | | 7/2008 |

OTHER PUBLICATIONS

European Patent Office, Extended European Search Report, Application No. 24164160.4, Aug. 23, 2024, 12 pages.

* cited by examiner

LOAD POSITION VERIFICATION SYSTEMS AND METHODS

CROSS-REFERENCE TO RELATED APPLICATIONS

This application claims the benefit of U.S. Provisional Application No. 63/452,589, filed Mar. 16, 2023, which is herein incorporated by reference in its entirety.

BACKGROUND

The present disclosure relates generally to load detection systems and, more specifically, to a multi-position load detection system and method for a material handling vehicle.

Material handling vehicles have been developed to transport goods loaded onto generally standardized transport platforms. For example, material handling vehicles are often used to lift goods loaded onto a pallet. Pallets often have end supports and a central support, which together form one or more primary openings. Some material handling vehicles are configured to approach pallets and insert a two-tined fork into the primary openings of the pallet. The pallet and loaded goods may then be lifted with the forks. The combined pallet and loaded goods may be referred to as a load.

Material handling vehicles may use embedded scanners and/or sensors to determine when a load is positioned on the forks of the vehicle. Other load detection arrangements include the use of a unique set of forks with a built-in single position switch to sense when the load is in a specific position on the forks.

Some methods only allow for a single sensing range, which only indicates when a load is in one specific position. When the load has a unique shape, the previous methods may not accurately sense the specific position of the load on the forks.

SUMMARY

In one aspect, the present disclosure provides a load position verification system for detecting a load on at least one fork of a material handling vehicle. The system includes a first arm extending parallel with a first fork of the material handling vehicle and a second arm, opposite the first arm, extending parallel with a second fork of the material handling vehicle. In one example, the system includes one or more sensors, each sensor having a transmitter configured to transmit a beam and a receiver configured to receive the beam, positioned within the arms. In one example, the system may indicate that no load is on the forks when the receiver receives the beam from the transmitter. In another example, the system may indicate that a load is on the forks when the receiver does not receive the beam from the transmitter.

In another aspect, the present disclosure provides a method of verifying the position of a load on a material handling vehicle. In one example, the material handling vehicle receives a first signal from a first sensor on the material handling vehicle. The vehicle then determines that a load is in a first position on the material handling vehicle based on the first signal. Upon continued traversal towards the load, the vehicle receives a second signal from a second sensor on the material handling vehicle after the first signal. The vehicle then determines that the load is in a second position on the material handling vehicle based on the second signal. In one example, the first signal is generated via interruption of a beam extending between a first transmitter and a first receiver of the first sensor.

In another aspect, the present disclosure provides a load position verification system for a material handling vehicle. The load position verification system including a first arm separate from and extending substantially parallel to a first fork of a material handling vehicle, a second arm, opposite the first arm, separate from and extending substantially parallel to a second fork of the material handling vehicle, and a support extending between the first arm and the second arm. In one example, the support is secured to the material handling vehicle. The system further includes a first sensor positioned within the first arm to indicate a load is present in a first position on the material handling vehicle and a second sensor positioned within the second arm to indicate a load is present in a second position on the material handling vehicle.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

DETAILED DESCRIPTION

Figure 1A:
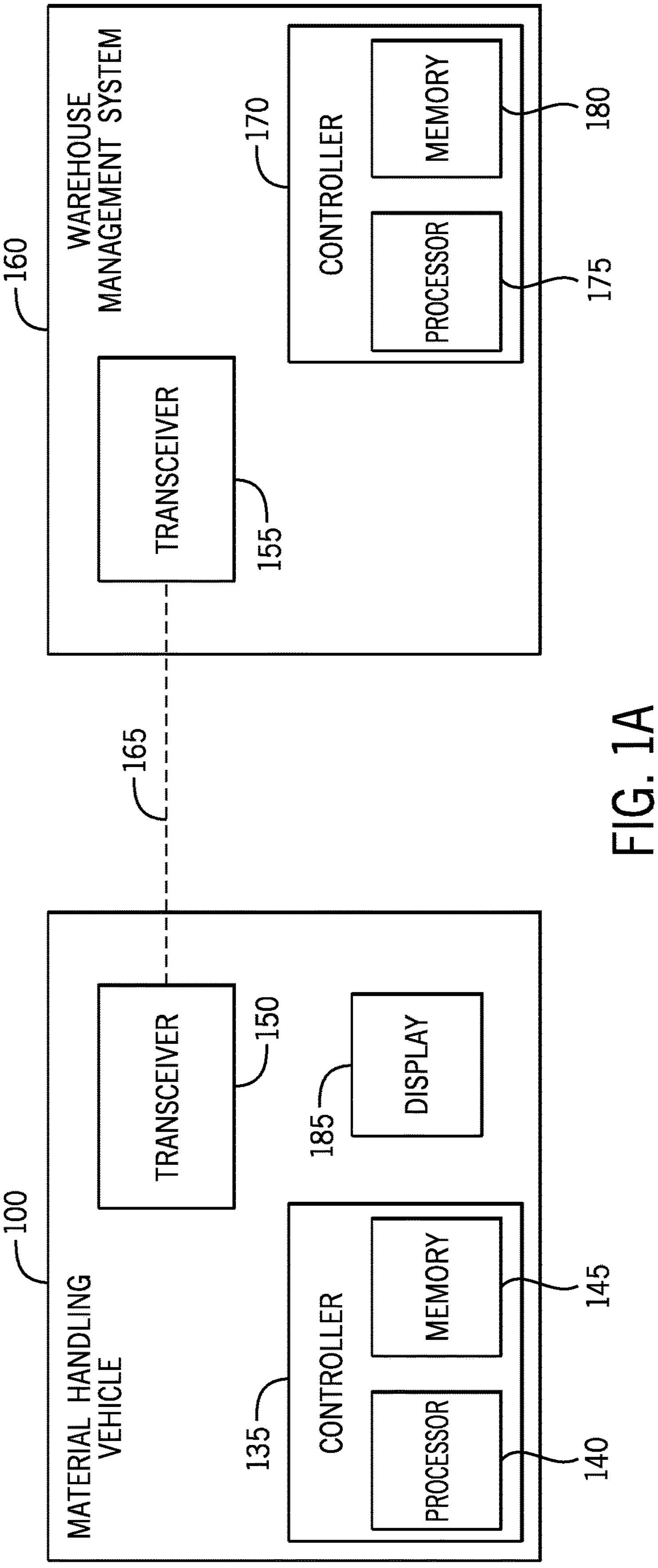
FIG. 1A is a diagrammatic view of a material handling vehicle according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

It is also to be appreciated that material handling vehicles are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles. Further, the present disclosure is not limited to material handling vehicles applications. Rather, the present disclosure may be provided for other types of vehicles, such as automobiles, buses, trains, tractor-trailers, farm vehicles, factory vehicles, and the like.

As should be noted, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

Figure 1B:
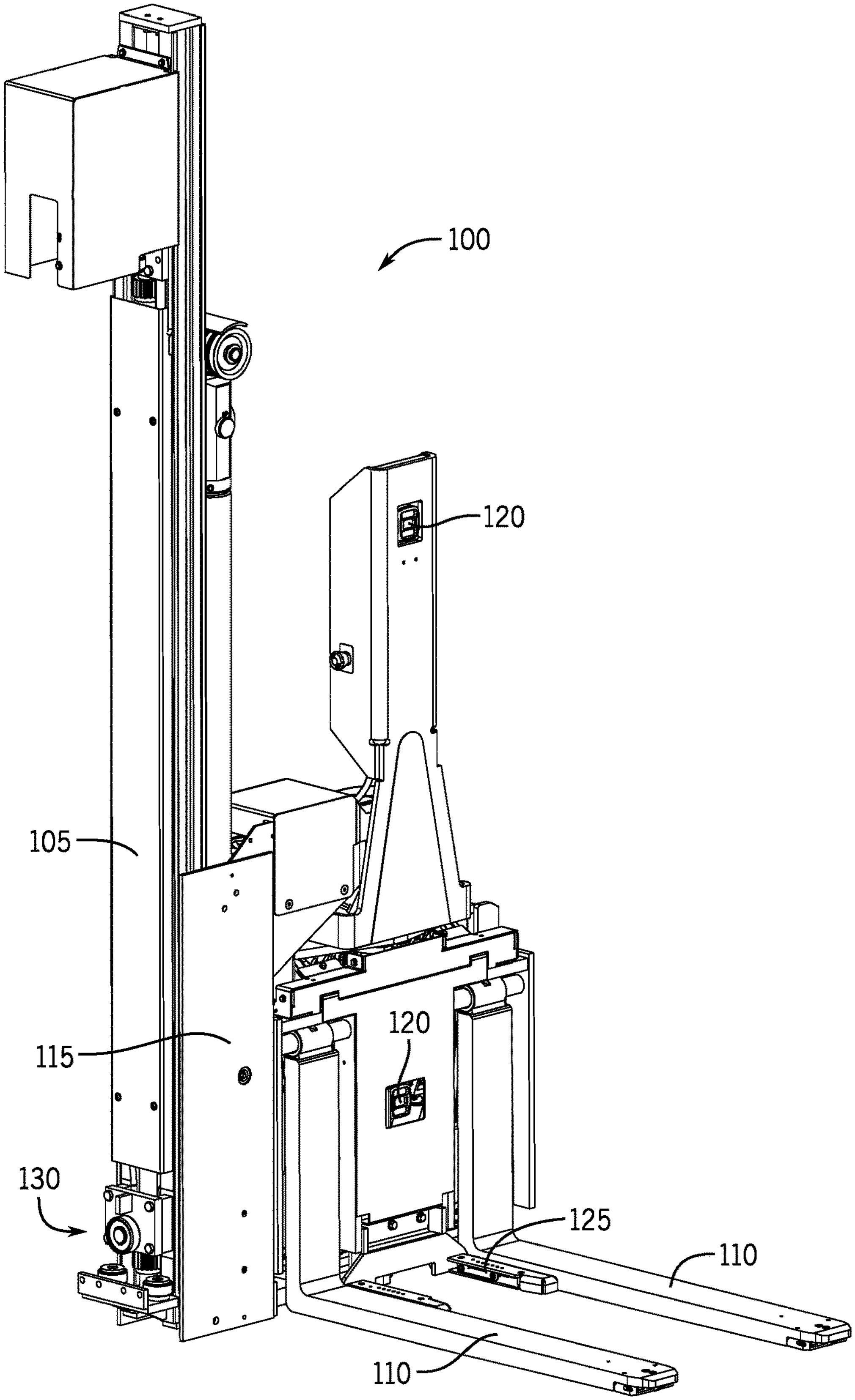
FIG. 1B is a perspective view of a portion of the material handling vehicle of FIG. 1A according to aspects of the present disclosure.

FIGS. 1A and 1B illustrate a non-limiting example of a material handling vehicle 100 according to the present disclosure. The material handling vehicle 100 can include a mast 105, one or more forks 110 extending from a fork carriage 115, and one or more hydraulic actuators 130 configured to actuate the forks. In one example, the forks 110 may include a pair of forks 110 on which various loads can be manipulated and/or carried by the material handling vehicle 100. The mast 105 can be coupled to the hydraulic actuators 130 so that the hydraulic actuators can selectively tilt and/or lift the mast 105. The carriage 115 can be raised on the mast 105 to raise and/or lower a load positioned on the forks 110. The carriage 115 can be coupled to the mast 105 so that when the mast 105 is tilted, the carriage 115 can be tilted, and the forks 110 can be raised. In some examples, the carriage 115 may include one or more cameras 120 to permit autonomous and/or partially autonomous operation of the material handling vehicle 100. In other examples, the cameras 120 may assist an operator in obstacle detection. A load position verification system 125 may be removably coupled to the carriage 115, between the forks 110.

The material handling vehicle 100 may further include a controller 135 having a processor 140 and a memory 145. In one example, the material handling vehicle 100 may include a transceiver 150 to communicate with a transceiver 155 of a warehouse management system 160 via a warehouse communication network 165. For example, the material handling vehicle 100 and the warehouse management system 160 may communicate via a wired and/or wireless connection, such as Wi-Fi, Bluetooth, ethernet, etc. In one example, the warehouse management system 160 may include a controller 170 having a processor 175 and a memory 180.

As should be appreciated, in some examples, the warehouse management system 160 may generate a pick request via the controller 170 and then transmit the pick request via the warehouse communication network 165 to the material handling vehicle 100 for fulfilment.

Figure 2:
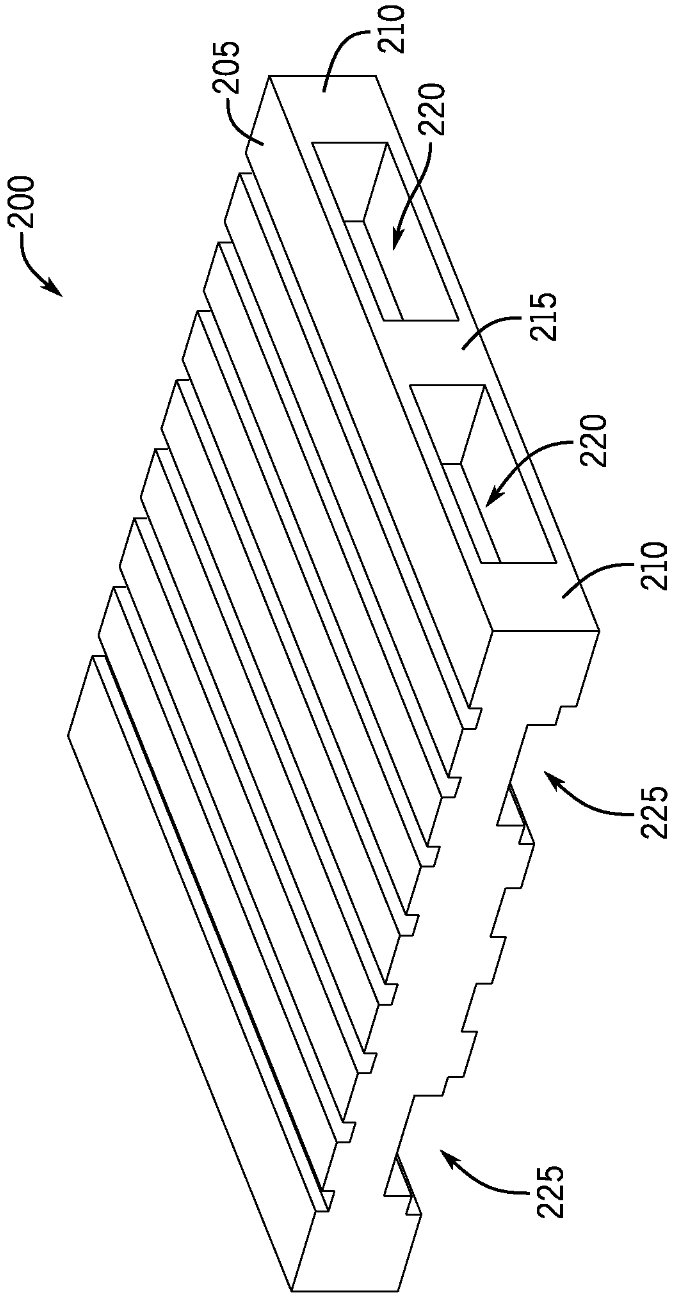
FIG. 2 is a perspective view of a pallet for use with the material handling vehicle of FIG. 1B according to aspects of the present disclosure.

FIG. 2 shows an example of a load, such as a pallet 200 for use with the material handling vehicle 100. The pallet 200 may include a load deck 205 to support a load in the form of boxes, goods, and/or other loads. The load deck 205 may be supported via one or more end supports 210 and a central support 215. The load deck 205, the end supports 210, and the central support 215 together may form one or more primary openings 220 configured to receive the forks 110 of the material handling vehicle 100. Additionally or alternatively, the load deck 205, end supports 210, and the central support 215 together may form one or more secondary openings 225 configured to receive the forks 110 of the material handling vehicle 100. In one example, the pallet 200 may be made from a variety of materials, such as wood, composite materials, polymeric materials, metal, and/or any combination thereof.

Figure 3:
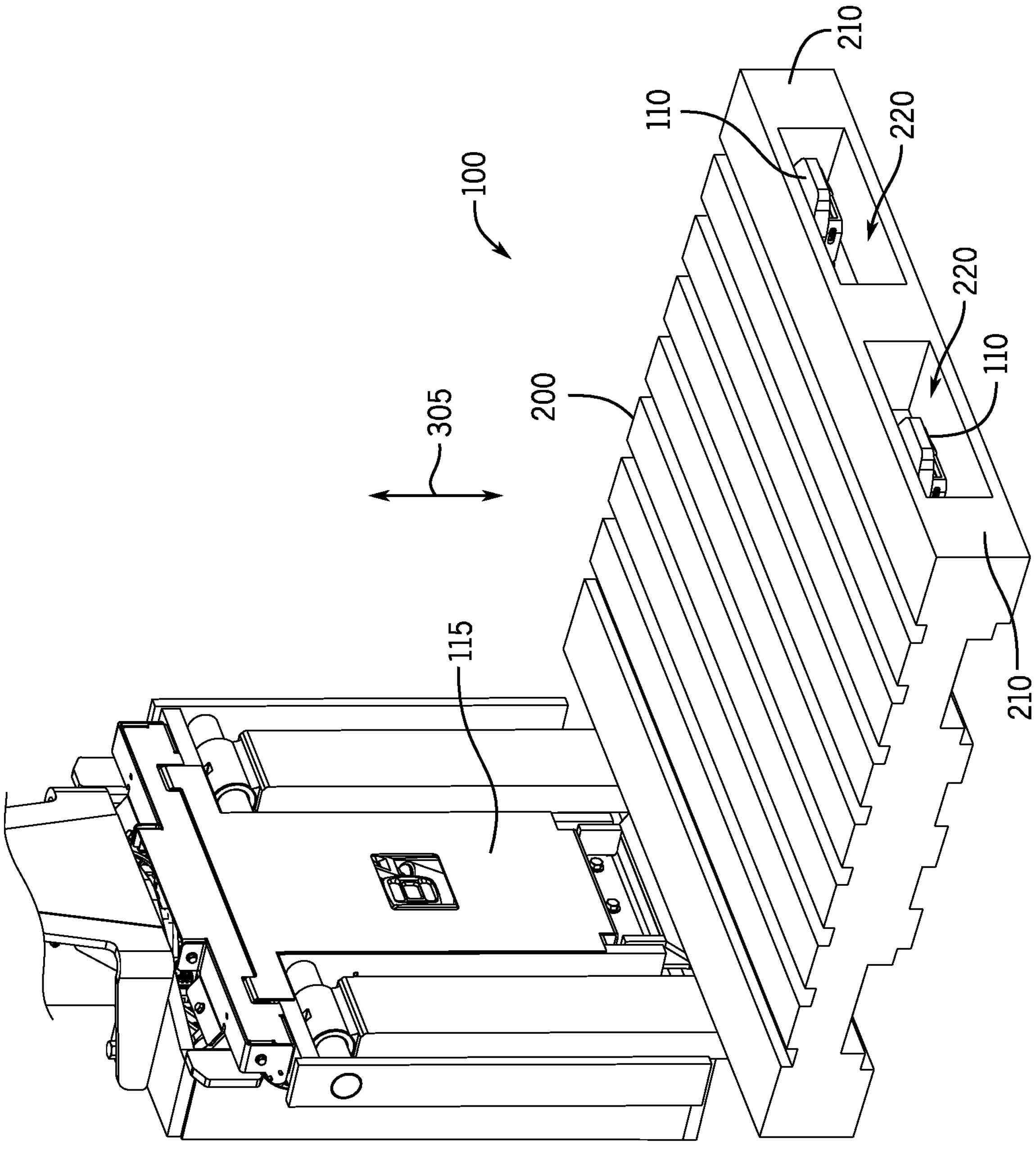
FIG. 3 is a perspective view of the pallet of FIG. 2 loaded onto the material handling vehicle of FIG. 1B according to aspects of the present disclosure.

As illustrated in FIG. 3, the material handling vehicle 100 is configured to lift and/or support the pallet 200 via the forks 110 arranged through the one or more primary openings 220. As should be appreciated, the material handling vehicle 100 may alternatively lift and/or support the pallet 200 via the one or more secondary openings 225 described previously. In one example, the material handling vehicle 100 lifts or lowers the pallet 200 as shown by arrow 305 with the central support 215 of the pallet 200 arranged between the forks 110 and the end supports 210 arranged outside of the forks 110.

Figure 4:
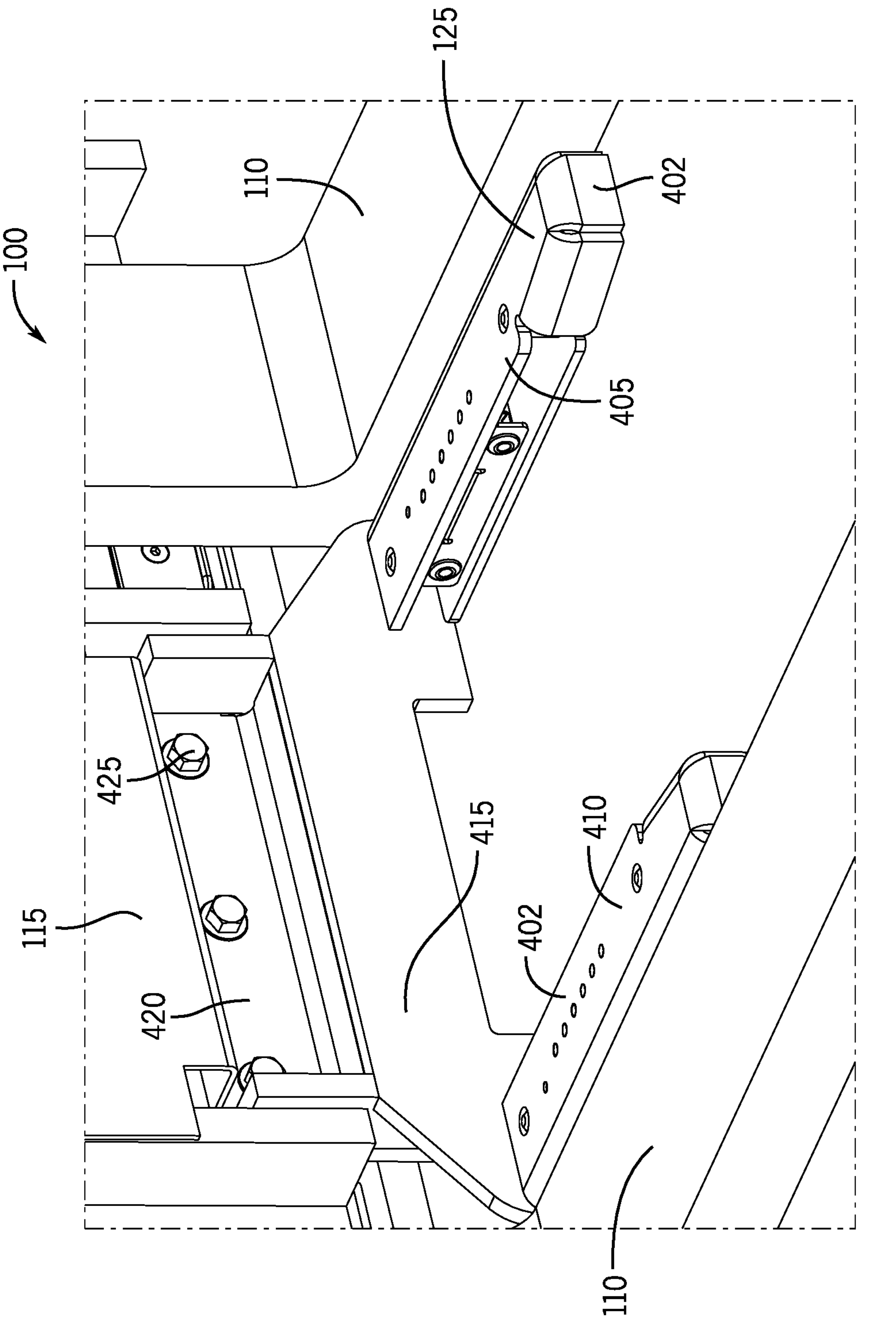
FIG. 4 is a perspective view of a portion of the material handling vehicle of FIG. 1B according to aspects of the present disclosure.

FIG. 4 shows an example of a portion of the material handling vehicle 100 showing the position of the load position verification system 125 between the forks 110 of the material handling vehicle 100. As shown, the load position verification system 125 may include a pair of arms 402, such as a first arm 405 and a second arm 410 extending substantially parallel with the forks 110. In one example, the first arm 405 and the second arm 410 are coupled together via a support 415, which forms an arch and/or bridge between the first arm 405 and the second arm 410. The support 415 may be mounted to a mounting flange 420 secured to the carriage 115 of the material handling vehicle 100 via one or more fasteners 425, such as bolts, nuts, rivets, nails, adhesive, screws, welds, and/or any other fasteners. Thus, the load position verification system 125 is separate from the forks 110 of the material handling vehicle 100, with the arms 405, 410 connected to the material handling vehicle 100 via the support 415 secured to the carriage 115.

Figure 5:
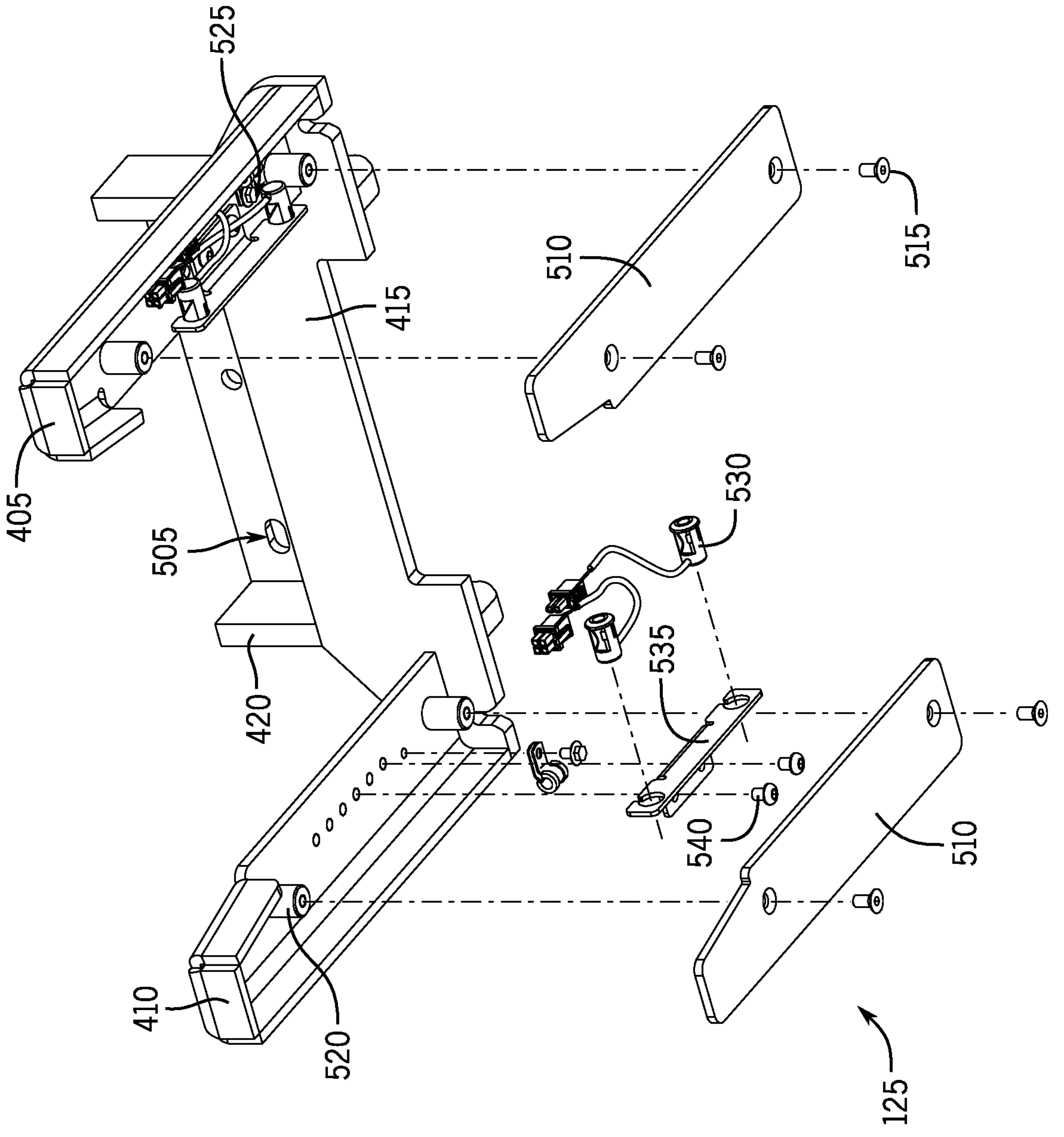
FIG. 5 is a bottom exploded view of a load position and verification device for use with the material handling vehicle of FIG. 1B according to aspects of the present disclosure.

Looking at FIG. 5, the mounting flange 420 of the load position verification system 125 includes one or more openings 505 defined by the mounting flange 420. In one example, the openings 505 may define a circular shape and/or an ovular shape, which enables a user to adjust a position (e.g., horizontal or vertical) of the load position verification system 125 (e.g., between the forks 110).

With continued reference to FIG. 5, the load position verification system 125 can include a pair of cover plates 510 corresponding to the arms 402. In one example, the cover plates 510 may cover a bottom of the load position verification system 125 to prevent dirt and/or debris from entering the system 125. Additionally, the cover plates 510 may permit a user to gain access to one or more interior components of the load position verification system 125 for maintenance and/or other reasons. The cover plates 510 may be secured to the arms 402 via one or more fasteners 515, such as bolts, nuts, screws, and/or any other removable fasteners. In one example, the cover plates 510 can interact with or rest on one or more spacers 520 mounted on an interior of the arms 402. The spacers 520 may provide a predetermined offset and/or spacing between the interior of the arms 402 and the cover plates 510, such that a gap and/or opening is formed between the arms 402 and the cover plates 510. In one example, the opening may receive one or more sensor assemblies 525. The sensor assemblies 525 may include one or more sensors 530 secured within the opening via a mounting plate 535 and one or more fasteners 540. In one example, the sensors 530 may be photoelectric sensors, such as reflective photoelectric sensors, thrubeam photoelectric sensors, and/or retroreflective photoelectric sensors. In other examples, the spacers 520 may be other forms of sensors, such as proximity sensors, photoeyes, position sensors, and/or any other form of sensor.

The sensors 530 can be coupled to and in communication with the controller 135. The controller 135 can be used as part of a material handling vehicle control system to detect and/or analyze signals from the sensors. As mentioned previously, the controller 135 may also be in communication with the warehouse management system 160, which may be able to remotely control the material handling vehicle 100. The controller 135 may be coupled to a human-machine interface including a display 185 (see, e.g., FIG. 1A) such as a heads-up display, a liquid crystal display (LCD), an organic light emitting diode (OLED) display, a flat panel display, a solid-state display, a light emitting diode (LED), an incandescent bulb, etc. The display 185 can be used by an operator to monitor operation of the material handling vehicle 100.

The memory may be computer readable media on which one or more sets of instructions, such as the software for operating the methods of the present disclosure can be embedded. The instructions may embody one or more of the methods or logic as described herein. In a particular example, the instructions may reside completely, or at least partially, within any one or more of the memory, the computer readable medium, and/or within the processor during execution of the instructions.

The processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory includes multiple kinds of memory, particularly volatile memory and non-volatile memory.

The terms “non-transitory computer-readable medium” and “tangible computer-readable medium” should be understood to include a single medium or multiple media, such as a centralized or distributed database, and/or associated caches and servers that store one or more sets of instructions. The terms “non-transitory computer-readable medium” and “tangible computer-readable medium” also include any tangible medium that is capable of storing, encoding or carrying a set of instructions for execution by a processor or that cause a system to perform any one or more of the methods or operations disclosed herein. As used herein, the term “tangible computer readable medium” is expressly defined to include any type of computer readable storage device and/or storage disk and to exclude propagating signals.

Figure 6:
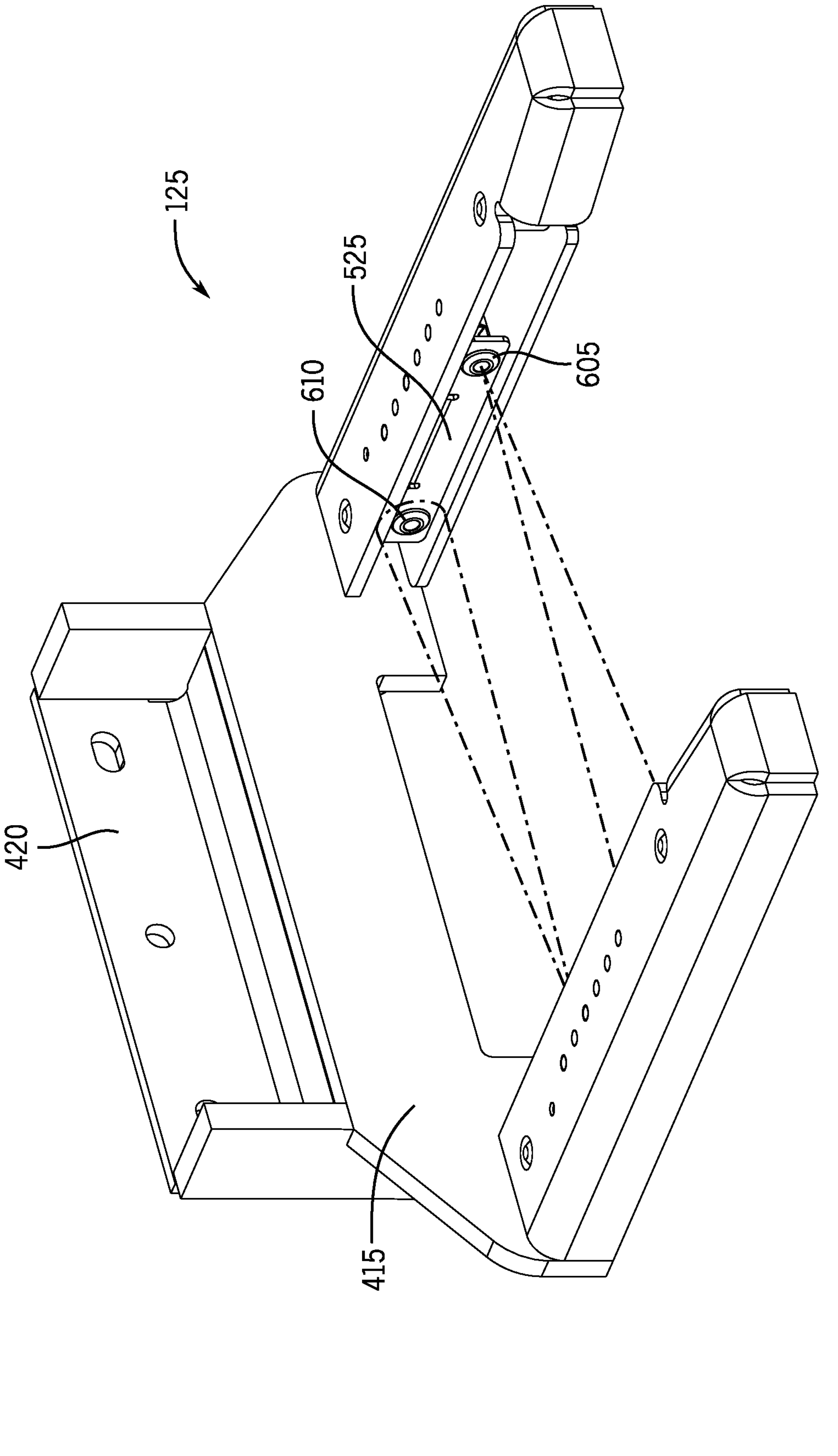
FIG. 6 is a perspective view of the load position and verification device of FIG. 5 according to aspects of the present disclosure.
Figure 7:
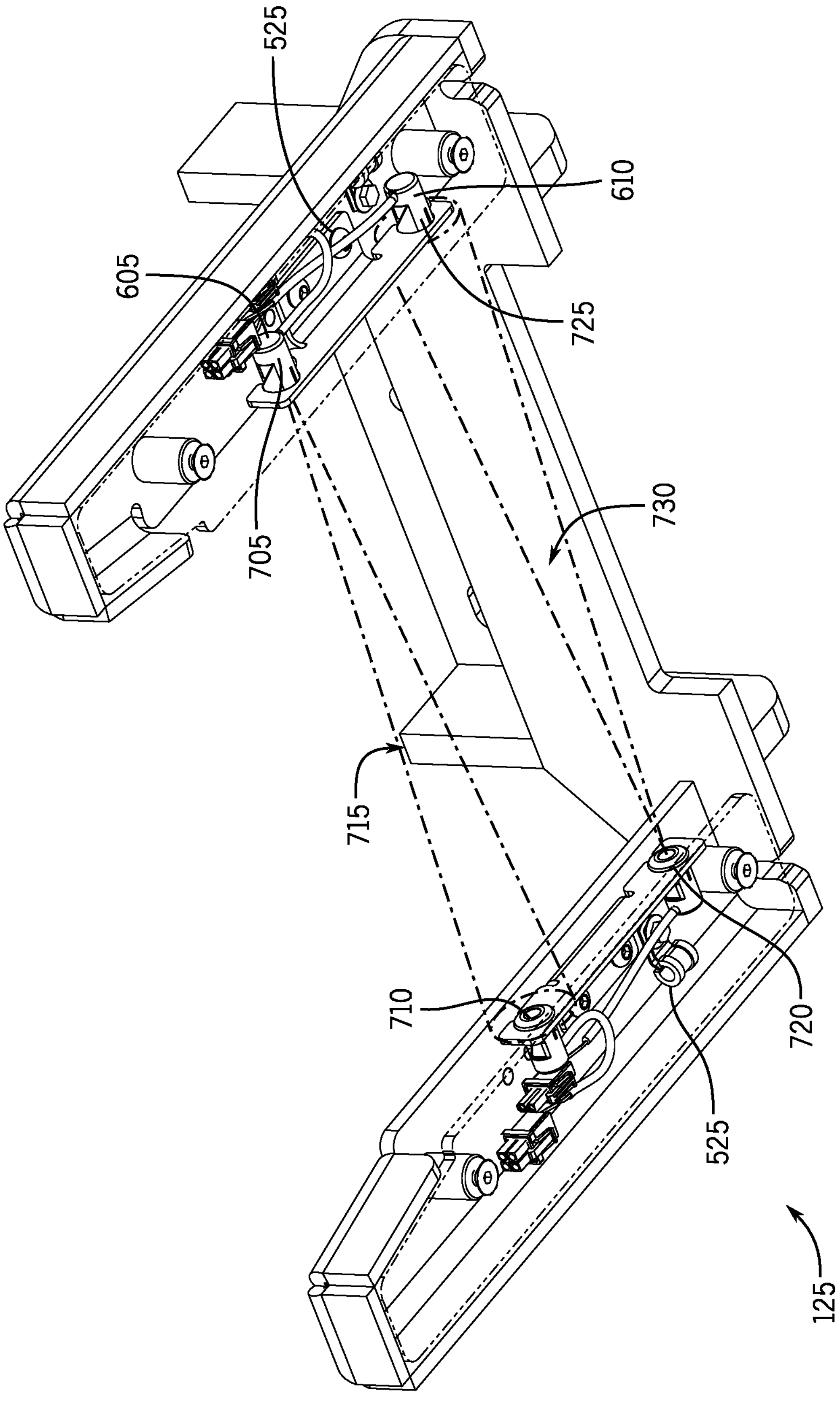
FIG. 7 is a bottom perspective view of the load position and verification device of FIG. 5 according to aspects of the present disclosure.

With reference to FIGS. 6 and 7, the sensor assemblies 525 may include a first sensor 605 and a second sensor 610.

The first sensor 605 may indicate when the load has reached a first load position on the forks 110, while the second sensor 610 may indicate when the load has reached a second load position on the forks 110. The first sensor 605 may include a first transmitter 705 and a corresponding first receiver 710. The first transmitter 705 is configured to send a first beam 715, such as an infrared beam, at a predetermined frequency to the first receiver 710. The first receiver 710 is configured to receive the first beam 715 to confirm that the load has not reached the first load position. The second sensor 610 may include a second transmitter 720 and a second receiver 725. The second transmitter 720 is configured to send a second beam 730, such as an infrared beam, at a predetermined frequency to the second receiver 725. The second receiver 725 is configured to receive the second beam 730 to confirm that the load has not reached the second load position. In one example, the first transmitter 705 and the second transmitter 720 may emit beams of the same frequency to the first receiver 710 and the second receiver 725, respectively. However, in other examples, the first transmitter 705 and the second transmitter 720 may emit beams of different frequencies to prevent signal interference between the beams. In further examples, the first transmitter 705 of the first sensor 605 may be positioned adjacent a first fork while the second transmitter 720 of the second sensor 610 may be positioned diagonally opposite of the 705, adjacent the second, opposite fork. However, in other examples, the first transmitter 705 and the second transmitter 720 may each be positioned on the same fork, with both the first receiver 710 and the second receiver 725 positioned on a different, opposing, fork.

Figure 8:
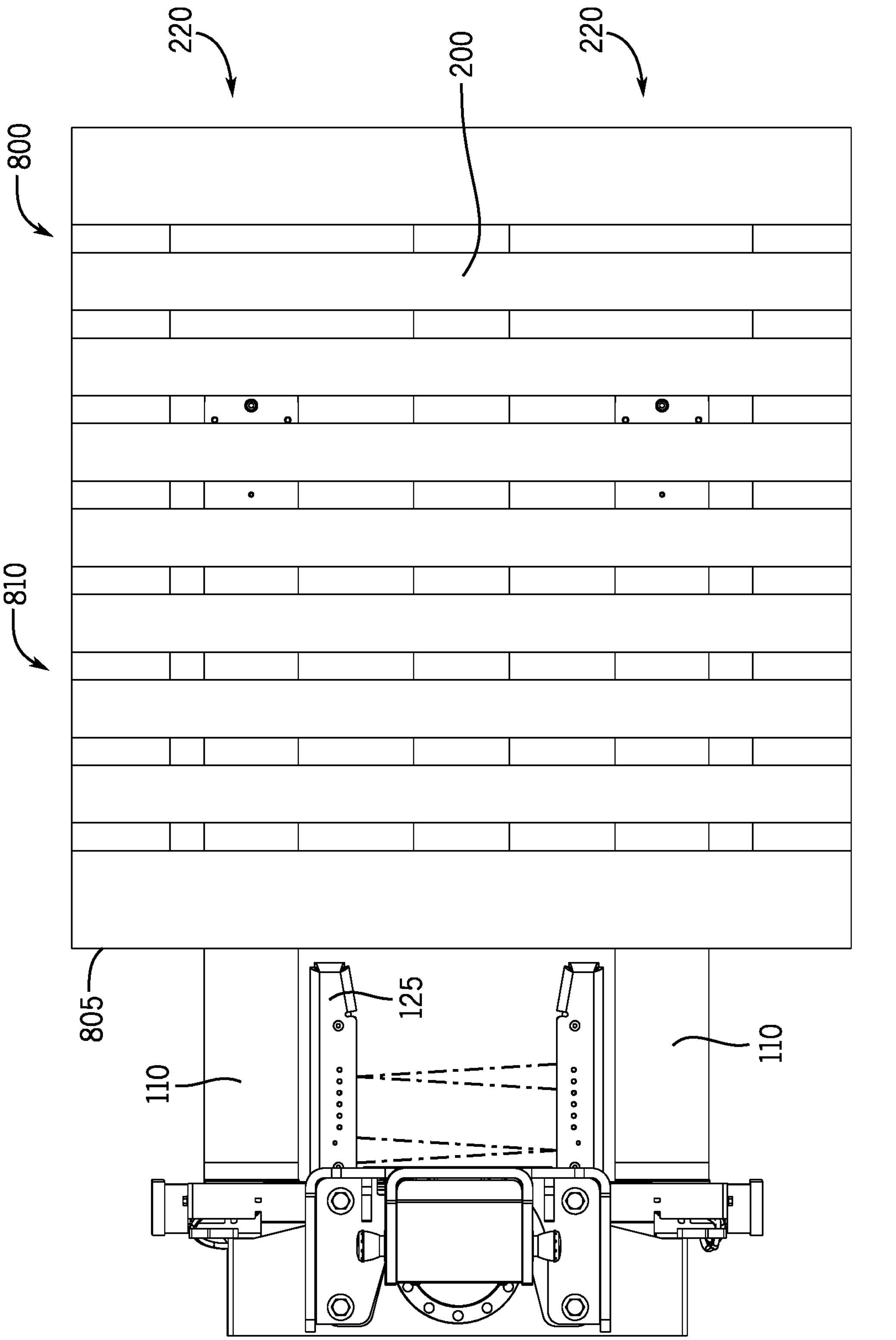
FIG. 8 is a top plan view of a first stage of a pallet loading process conducted by the material handling vehicle of FIG. 1B according to aspects of the present disclosure.
Figure 9:
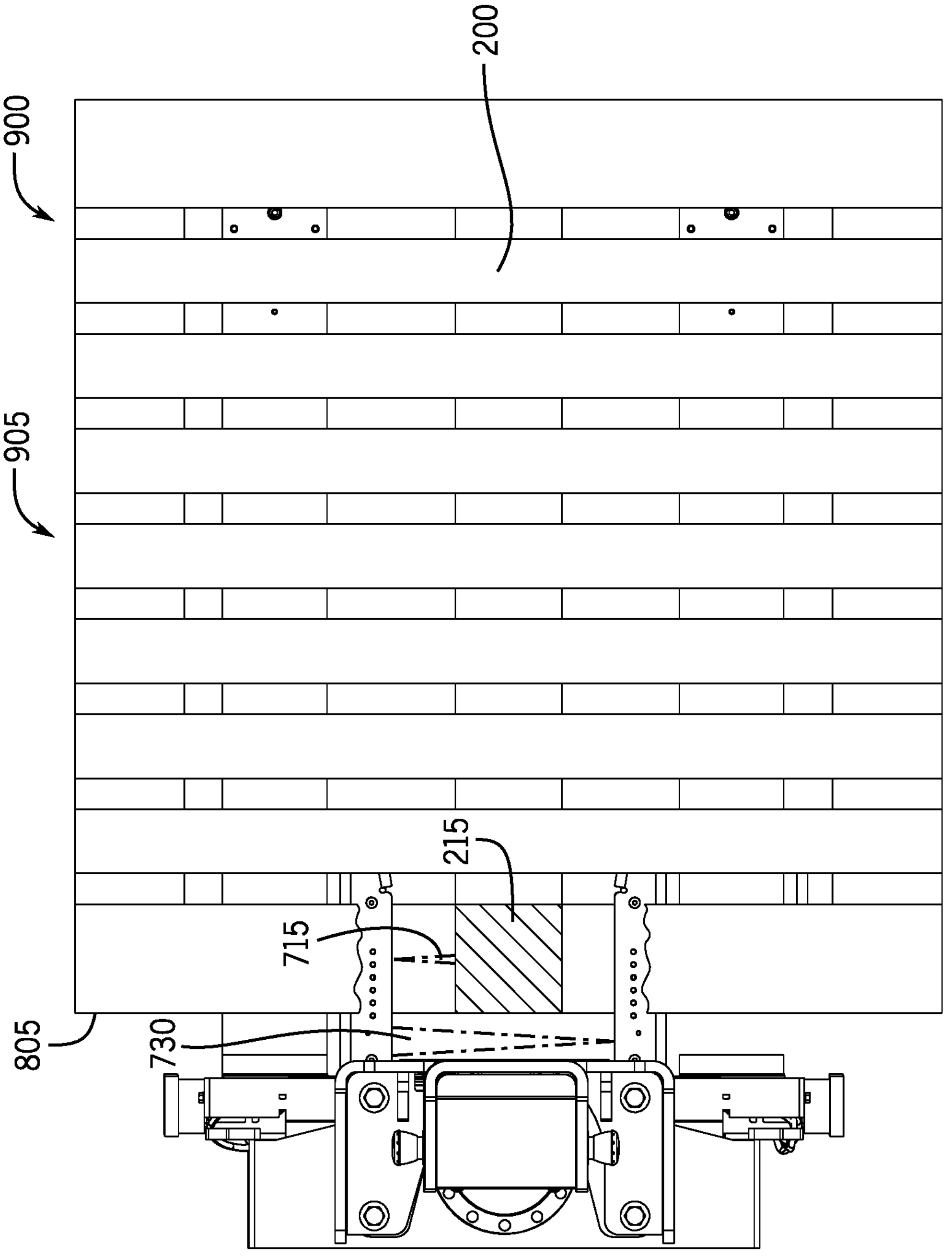
FIG. 9 is a top plan view of a second stage of the pallet loading process conducted by the material handling vehicle of FIG. 1B according to aspects of the present disclosure.
Figure 10:
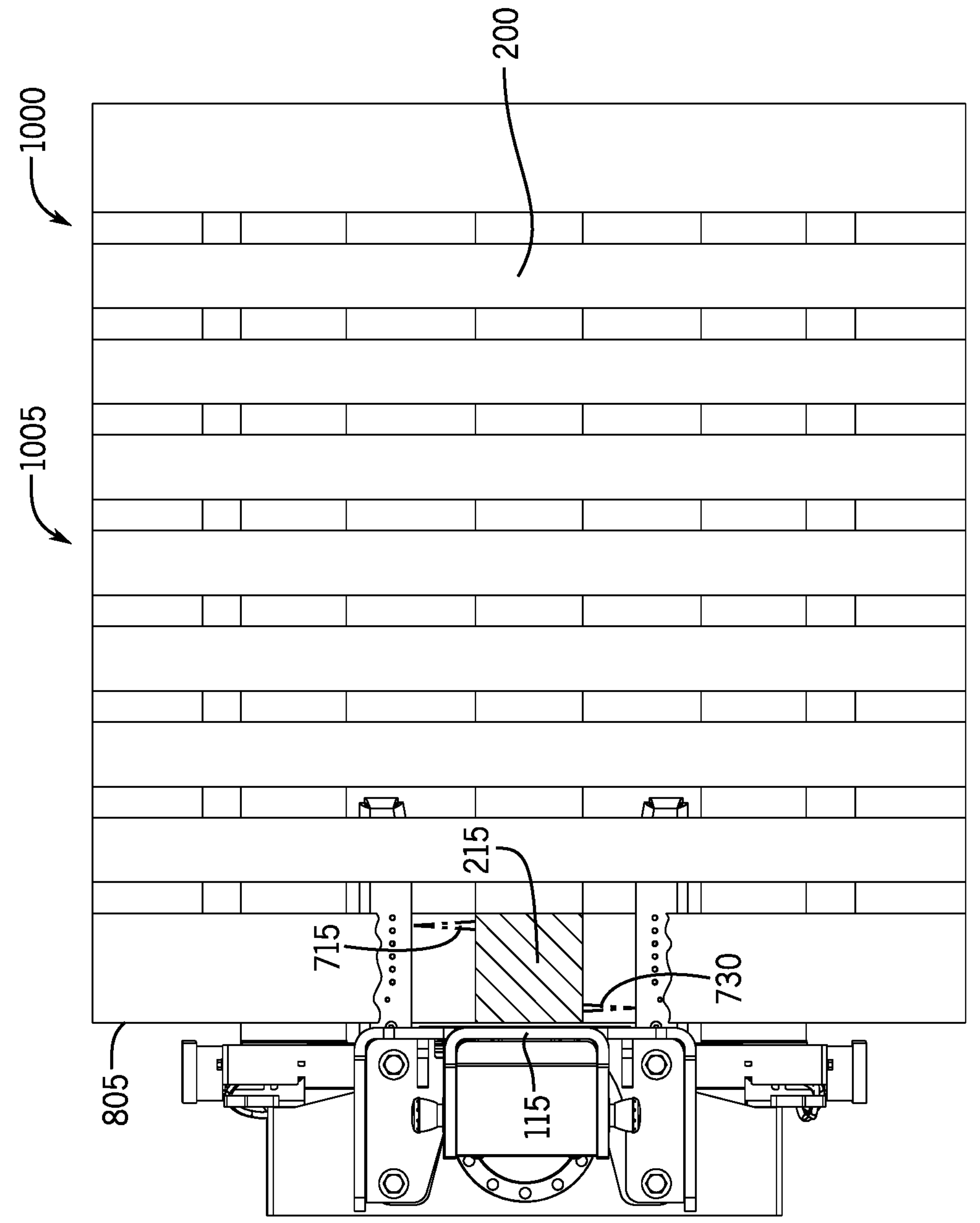
FIG. 10 is a top plan view of a third stage of the pallet loading process conducted by the material handling vehicle of FIG. 1B according to aspects of the present disclosure.

FIGS. 8-10 show multiple stages of a loading process completed by the material handling vehicle 100. In a first stage 800, the material handling vehicle 100 positions the forks 110 such that the forks 110 enter the primary openings 220 of the pallet 200. In one example, the material handling vehicle 100 may position the forks 110 with assistance from the camera 120. In another example, the material handling vehicle 100 may be positioned by an operator and/or user. As shown in FIG. 8, in the first stage 800, a leading edge 805 of the pallet 200 has not yet reached the load position verification system 125 and the material handling vehicle 100 can continue to advance the forks 110 forward until reaching a second stage 900. In one example, the first stage 800 may be an unloaded position 810.

In the second stage 900, the leading edge 805 of the pallet 200, specifically the leading edge 805 of the central support 215 of the pallet 200, breaks the first beam 715 of the first sensor 605. When the central support 215 breaks the first beam 715, the first receiver 710 stops receiving a signal from the first beam 715, thus the load position verification system 125 can determine that the first beam 715 is blocked from reaching the first receiver 710 and the pallet 200 is located in a first load position 905. Once the first beam 715 of the first sensor 605 is broken, the load position verification system 125 can indicate to an operator, warehouse management system, and/or controller that the pallet 200 has reached the first load position 905. At this time, the material handling vehicle 100 can await instructions on whether to lift and begin transporting the pallet 200 or proceed to a third stage 1000.

In the third stage 1000, the leading edge 805 of the pallet 200, specifically the leading edge 805 of the central support 215 of the pallet 200, breaks the second beam 730 of the second sensor 610. When the central support 215 breaks the second beam 730, the second receiver 725 stops receiving a signal from the second beam 730, thus the load position verification system 125 can determine that the second beam 730 is blocked from reaching the second receiver 725 and the pallet 200 is located in a second load position 1005. Once the second beam 730 of the second sensor 610 is broken, the load position verification system 125 can indicate to an operator, warehouse management system, and/or controller that the pallet 200 has reached the second load position 1005. As should be appreciated, in the second position, the leading edge 805 of the pallet 200 may be contacting and/or nearly contacting the carriage 115 of the forks 110, such that the forks 110 are fully inserted into the primary openings 220 of the pallet 200. In one example, after reaching the second load position 1005, the material handling vehicle 100 can proceed to lift the pallet 200 and begin transport of the pallet 200 to a predetermined and/or operator determined location.

In some examples, when the first sensor 605 is triggered by the central support 215 breaking the first beam 715, a first signal can be produced that can indicate the load is in the first load position 905, such as, the load is seated on the forks 110. The first signal can be received by the material handling vehicle control system to indicate to the operator, or to the warehouse management system, for example, that the load is in the first load position 905. In some examples, the operator may be notified via the display 185 that the load is in the first load position 905. In one example, when the load is in the first load position 905, the first signal received by the material handling vehicle control system can indicate to the operator the load is in a desired position and that the material handling vehicle can stop advancing to engage to load. In some examples, the operator may be notified via the display that the load is in the desired position.

If the material handling vehicle 100 continues to travel toward the load once the first sensor 605 is triggered, the load can continue to move along the forks 110 until the second sensor 610 is triggered. When the second sensor 610 is triggered, a second signal can be produced that can indicate that the load is in the second load position 1005, such as, the load is fully seated on the forks 110. The second signal can be received by the material handling vehicle control system to indicate to the operator, or warehouse management system, for example, that the load is in the second load position 1005 and/or that the load is ready to be lifted, moved, or otherwise handled. In some examples, the operator may be notified via the display 185 that the load is ready to be lifted, moved, or otherwise handled. In one example, when the load is in the second load position 1005, the second signal received by the material handling vehicle control system can indicate to the operator the load has been fully seated on the forks 110 and that the material handling vehicle can stop advancing to engage the load. In some examples, the operator may be notified via the display that the load has been fully seated on the forks 110 and that the material handling vehicle can stop advancing to engage the load. The second signal can be used to indicate that the load is being pushed on the floor, and to signal the material handling vehicle to stop advancing.

As should be appreciated, when the pallet 200 is in the second load position 1005, both the first sensor 605 and the second sensor 610 may be obstructed. Put differently, in the second load position 1005, both the first beam 715 and the second beam 730 may be blocked by the pallet 200. In other examples, when the pallet 200 is in the second load position, only the second sensor 610 may be obstructed. Put differently, in the second load position, only the second beam 730 may be blocked by the pallet 200. In one example, when the pallet is in the second load position and only the second beam 730 is broken by the pallet 200 (e.g., the first beam 715 is unbroken), a signal (e.g., a fault signal) may be sent from the material handling vehicle to the warehouse management system or the display to indicate (e.g., to an operator) that the first sensor 605 should be inspected or may need maintenance. The load position verification system 125 can enable the use of two or more dedicated sensing ranges. By changing the number and/or position of the sensors alternate sensing locations and intervals can be adjusted to meet customer and/or user demand.

Figure 11:
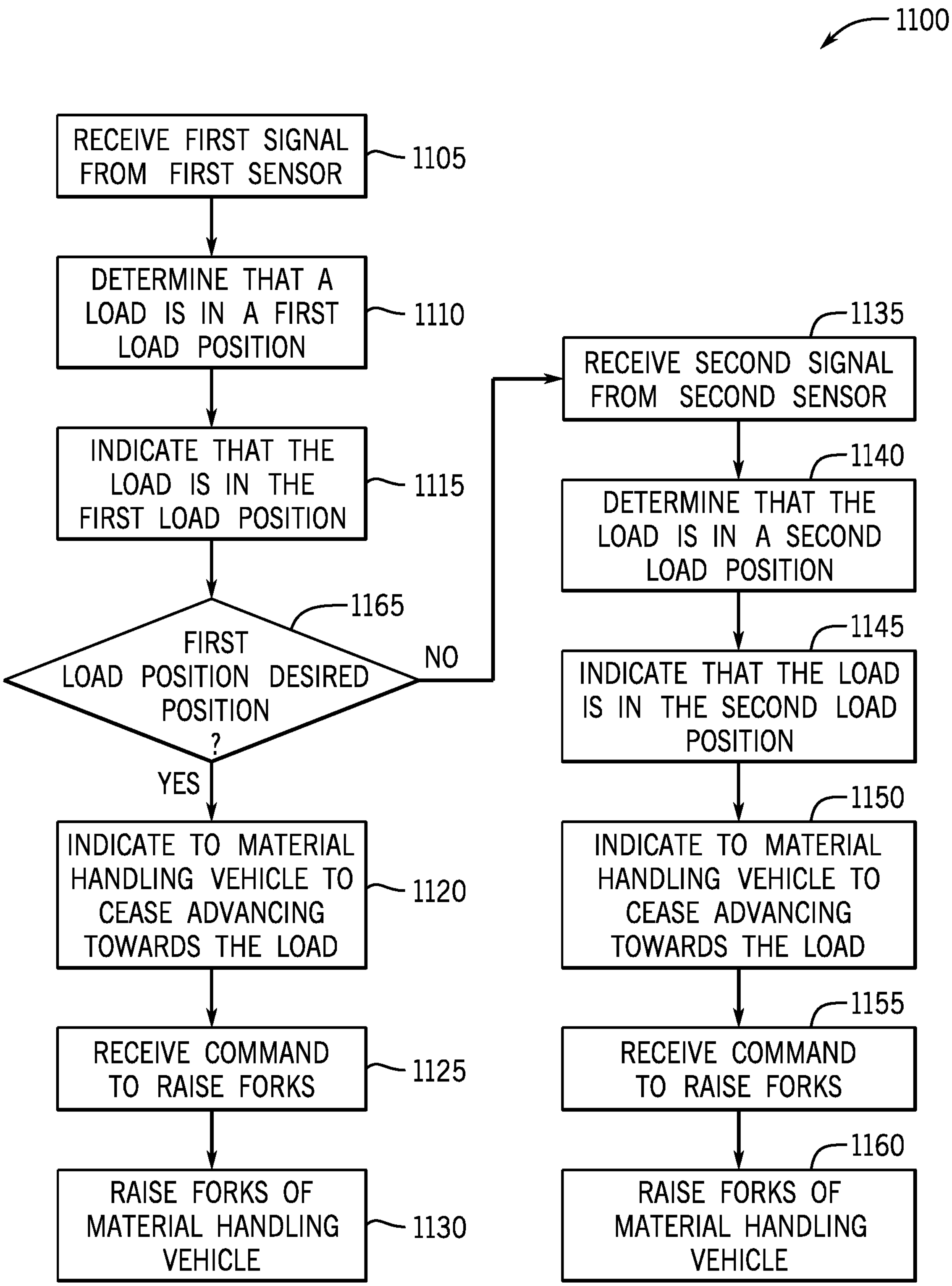
FIG. 11 is a flowchart depicting the pallet loading process shown in FIGS. 8-10 according to aspects of the present disclosure.

Referring to FIG. 11, an example of process 1100 for implementing the load position verification system 125 in the material handling vehicle 100 is shown. The process 1100 can be implemented by the processor 140 as instructions on the memory 145 of a computational device such as the controller 135 coupled to and in communication with the first sensor 605 and the second sensor 610 as described above.

At stage 1105, the processor can receive a first signal from the first sensor 605 coupled to the material handling vehicle 100. The first signal may be one of a plurality of values if the first sensor 605 is a polychotomous sensor such as a proximity sensor. The first signal may be a discrete value such as on or off if the first sensor 605 is a certain sensor type such as a contact switch and/or photoelectric sensor. The process 1100 can then proceed to stage 1110.

At stage 1110, the processor can determine that the pallet 200 is in the first load position 905. For example, the processor can determine that the pallet 200 is in the first load position 905 when the processor receives a signal from the first sensor 605 but does not receive a signal form the second sensor 610.

At stage 1115, the processor can indicate to at least one of the operator and/or the warehouse management system that the pallet 200 is in the first load position 905 and/or seated on the forks 110. In some examples, the processor can indicate to the operator that the pallet 200 is in the first load position and/or seated on the forks 110 using an interface coupled to the material handling vehicle 100. The interface may be a display 185 such as a heads-up display, a liquid crystal display (LCD), an organic light emitting diode (OLED) display, a flat panel display, a solid-state display, a light emitting diode (LED), or an incandescent bulb. In some examples, the processor can indicate to the warehouse management system over the warehouse communication network 165, such as a Wi-Fi® or cellular network for example, that the pallet 200 is in the first load position and/or seated on the forks 110.

At stage 1165, the processor may determine whether the first load position 905 has been selected to be the desired position for lifting the pallet 200. If the first load position has been selected as the desired position for lifting the pallet, at stage 1120, the processor can indicate to the material handling vehicle 100 to cease advancing towards the pallet 200. For example, the processor may cause a system of the material handling vehicle 100 to brake and stop forward progress towards the pallet 200. The process 1100 can then proceed to stage 1125.

At stage 1125, the processor can receive a command to raise the forks 110 a vertical distance from one of the operator and/or the warehouse management system. The command can be received from the operator via an input on the interface if the interface is capable of receiving inputs, such as a touch screen flat panel display. Alternatively, the command can be received from a keypad, button, switch, knob, dial, or other electromechanical input device. The command can be received from the warehouse management system over a warehouse communication network such as a Wi-Fi network. The process 1100 can then proceed to stage 1130.

At stage 1130, the processor can cause the forks 110 to be raised the vertical distance. In some examples, the processor can control one or more hydraulic actuators to raise the forks 110. The forks 110 can in turn lift the pallet 200 as long as the load is in the first load position.

If the second load position 1005 has been selected to be the desired position for lifting the pallet 200 at stage 1165, the process 1100 can proceed to stage 1135.

At stage 1135, the processor can receive a second signal from the second sensor 610 coupled to the material handling vehicle 100. The second signal may be one of a plurality of values if the second sensor 610 is a polychotomous sensor such as a proximity sensor. The second signal may be a discrete value such as on or off if the second sensor 610 is a certain sensor type such as a contact switch and/or a photoelectric sensor. The process 1100 can then proceed to stage 1140.

At stage 1140, the processor can determine that the pallet 200 is in the second load position 1005. Depending on the setup of the system 125, the processor can then determine that the pallet 200 is fully seated on the forks 110 if the second load position has been selected to be the desired position for lifting the pallet 200. The process 1100 can then proceed to stage 1145.

At stage 1145, the processor can indicate to at least one of the operator and/or the warehouse management system that the pallet 200 is in the second load position, in a desired position for lifting, and/or fully seated on the forks 110 or that the material handling vehicle 100 can stop advancing towards the pallet 200. In some examples, the processor can indicate to the operator that the pallet 200 is in the second load position, in a desired position for lifting, and/or fully seated on the forks 110, or that the material handling vehicle 100 can stop advancing towards the pallet 200, using an interface coupled to the material handling vehicle 100. The interface may be a display such as a heads-up display, a liquid crystal display (LCD), an organic light emitting diode (OLED) display, a flat panel display, a solid-state display, a light emitting diode (LED), or an incandescent bulb. In some examples, the processor can indicate to the warehouse management system over a warehouse communication network such as a Wi-Fi network that the pallet 200 is in the second load position, in a desired position for lifting, and/or fully seated on the forks 110 or that the material handling vehicle 100 can stop advancing towards the pallet 200. The process 1100 can then proceed to stage 1150.

At stage 1150, the processor can indicate to the material handling vehicle 100 to cease advancing towards the pallet 200. For example, the processor may cause the material handling vehicle 100 to brake and stop forward progress towards the pallet 200. The process 1100 can then proceed to stage 1155.

At stage 1155, the processor can receive a command to raise the forks 110 a vertical distance from one of the operator or the warehouse management system. The command can be received from the operator via an input on the interface if the interface is capable of receiving inputs, such as a touch screen flat panel display. Alternatively, the command can be received from a keypad, button, switch, knob, dial, or other electromechanical input device. The command can be received from the warehouse management system over a warehouse communication network such as a Wi-Fi network. The process 1100 can then proceed to stage 1160.

At stage 1160, the processor can cause the forks 110 to be raised the vertical distance. In some examples, the processor can control one or more hydraulic actuators to raise the forks 110. The forks 110 can in turn lift the pallet 200 as long as the load is in the second load position.

Figure 12:
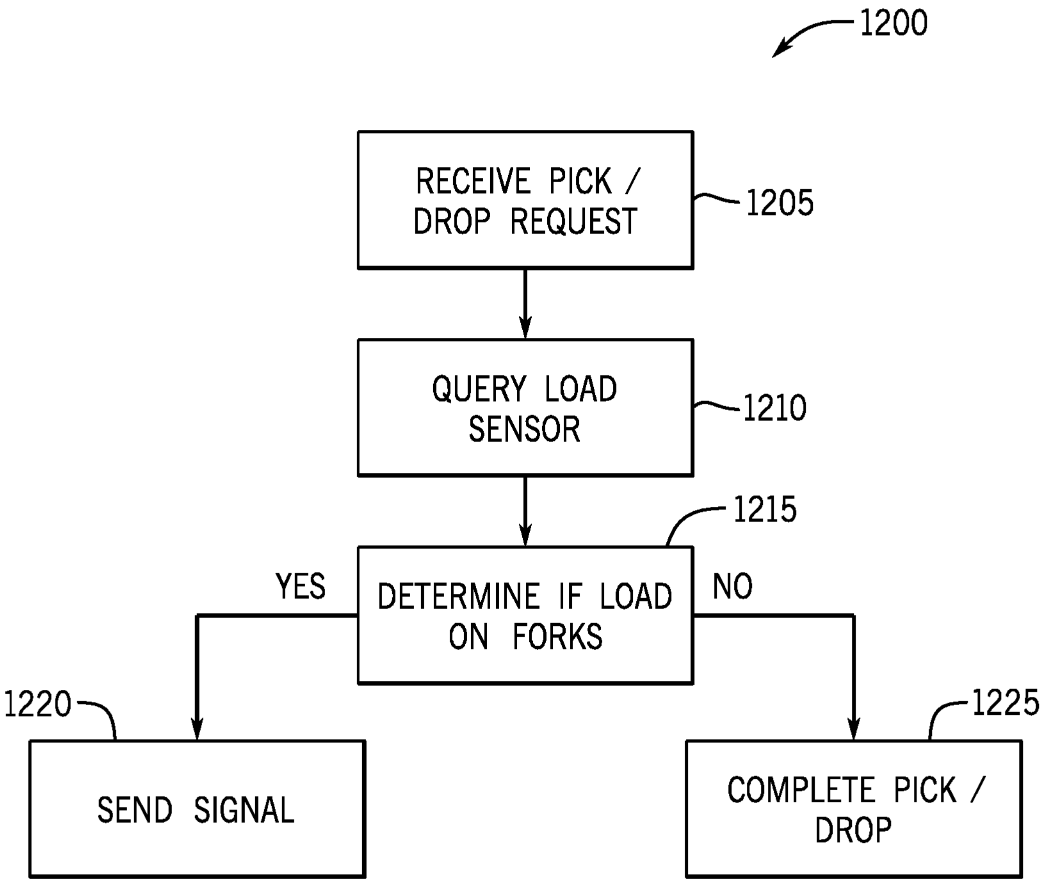
FIG. 12 is a flowchart depicting a pick process conducted by the material handling vehicle of FIG. 1B according to aspects of the present disclosure.

FIG. 12 shows a process 1200 for determining availability of the material handling vehicle 100 to respond to a pick or drop request from the warehouse management system 160 and/or an operator. At stage 1205 the material handling vehicle 100 receives a pick or drop request from the warehouse management system and/or the operator. At stage 1210 the material handling vehicle 100 can query the load position verification system 125 to determine if a load, such as pallet 200 is currently on the forks 110. For example, the load position verification system 125 may indicate that a load is currently on the forks 110 when the first sensor 605 and/or the second sensor 610 indicate the presence of a load as discussed previously. At stage 1215, the material handling vehicle 100 can determine whether the material handling vehicle 100 can fulfil the pick or drop request via the load position verification system 125. For example, as shown at stage 1220, if the material handling vehicle 100 determines via the load position verification system 125 that a load is positioned on the forks 110, the material handling vehicle 100 can send a signal and/or a message (e.g., a forks loaded signal) to the warehouse management system and/or operator indicating that a load is on the forks 110 and the material handling vehicle 100 cannot complete the requested pick. At stage 1225, if the material handling vehicle 100 determines via the load position verification system 125 that the forks 110 are free from a load, the material handling vehicle 100 can send a signal and/or a message (e.g., a forks unloaded signal) to the warehouse management system and/or operator that the material handling vehicle 100 can accept the pick request and the pick request can proceed.

In an example where the material handling vehicle 100 receives a drop request from the Warehouse Management System (WMS) and/or the operator, the material handling vehicle 100 can determine whether a load, such as pallet 200, is currently on the forks 110. The material handling vehicle 100 can then determine whether the material handling vehicle 100 can fulfil the drop request via the load position verification system 125. For example, if the material handling vehicle 100 determines via the system 125 that a load is not positioned on the forks 110, the material handling vehicle 100 can send a signal and/or message to the WMS and/or operator that there is no load on the forks 110 to drop, and the material handling vehicle 100 cannot complete the drop request. If the material handling vehicle 100 determines via the load position verification system 125 that the forks 110 are currently supporting a load, the material handling vehicle sends a signal and/or message to the WMS and/or operator that the material handling vehicle 100 has accepted the drop request and the drop request can proceed.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "substantially parallel" indicates a direction that is within plus or minus 12 degrees of a reference direction (e.g., within plus or minus 6 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "about" and "approximately," as used herein with respect to a reference value, refer to variations from the reference value of plus or minus 15 percent or less, inclusive of the endpoints of the range. Similarly, the term "substantially equal" (and the like) as used herein with respect to a reference value refers to variations from the reference value of less than plus or minus 30 percent inclusive. Where specified, "substantially" can indicate in particular a variation in one numerical direction relative to a reference value. For example, "substantially less" than a reference value (and the like) indicates a value that is reduced from the reference value by 30 percent or more, and "substantially more" than a reference value (and the like) indicates a value that is increased from the reference value by 30 percent or more.

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein.

We claim:

1. A load position verification system for a material handling vehicle, the material handling vehicle having a first fork and a second fork, the system comprising:

a first arm arranged between the first fork and the second fork and extending substantially parallel with the first fork of the material handling vehicle;

a second arm, opposite the first arm, arranged between the first fork and the second fork and extending substantially parallel with the second fork of the material handling vehicle;

one or more sensors positioned within the first arm and the second arm, including:

a transmitter to transmit a beam between the first arm and the second arm; and a receiver to receive the beam from the transmitter;

wherein the load position verification system indicates that no load is on the first fork and the second fork of the material handling vehicle when the receiver receives the beam from the transmitter; and wherein the load position verification system indicates that a load is on the first fork and the second fork of the material handling vehicle when the receiver does not receive the beam from the transmitter.

2. The system of claim 1, wherein the one or more sensors include a first sensor that defines a first load position and a second sensor that defines a second load position.

3. The system of claim 2, wherein the first sensor includes a first transmitter and a first receiver, and wherein the first transmitter and first receiver operate at a first frequency.

4. The system of claim 3, wherein the load interrupts the beam extending between the first transmitter and the first receiver when the load is in the first load position on the material handling vehicle.

5. The system of claim 3, wherein the second sensor includes a second transmitter and a second receiver, and wherein the second transmitter and the second receiver operate at a second frequency.

6. The system of claim 5, wherein the first frequency and the second frequency are different frequencies.

7. The system of claim 5, wherein the load interrupts the beam extending between the second transmitter and the second receiver when the load is in the second load position on the material handling vehicle.

8. The system of claim 7, wherein the load is a pallet, and wherein a central support of the pallet interrupts the beams extending between both the first transmitter and the first receiver and the second transmitter and second receiver when the pallet is in the second load position on the material handling vehicle.

9. The system of claim 1, wherein the first arm and the second arm are secured together via a support coupled to a carriage of the material handling vehicle.

10. A method of verifying a position of a load on a material handling vehicle using a load position verification system, the method comprising:

receiving a first signal from a first sensor in response to an interruption of a beam extending from the first sensor, the first sensor arranged on a first arm of the load position verification system, the first arm being arranged between a first fork and a second fork of the material handling vehicle, with the first arm being separate from and extending substantially parallel with the first fork of the material handling vehicle;

determining that a load is in a first load position on the material handling vehicle based on receipt of the first signal;

receiving a second signal from a second sensor in response to an interruption of a beam extending from the second sensor, the second sensor arranged on a second arm of the load position verification system, the second arm being arranged between the first fork and the second fork of the material handling vehicle, with the second arm being separate from and extending substantially parallel with a second fork of the material handling vehicle, the second sensor positioned sequentially after the first sensor;

determining that the load is in a second load position on the material handling vehicle based on receipt of the second signal; and instructing the material handling vehicle to stop advancing towards the load in response to determining that the load is in the second load position.

11. The method of claim 10, wherein the first signal is generated via interruption of a beam extending between a transmitter and a receiver of the first sensor, and wherein the second signal is generated via interruption of a beam extending between a transmitter and a receiver of the second sensor.

12. The method of claim 10, further comprising:

receiving a pick request from a warehouse management system;

querying the load position verification system to determine whether a load is present on the material handling vehicle; and sending a message to the warehouse management system indicating that the material handling vehicle cannot complete the pick request when the system determines a load is present on the material handling vehicle.

13. The method of claim 10, further comprising:

receiving a pick request from a warehouse management system;

querying the load position verification system to determine whether a load is present on the material handling vehicle; and completing the pick request when the load position verification system determines no load is present on the material handling vehicle.

14. A load position verification system for a material handling vehicle, the material handling vehicle having a first fork and a second fork, the system comprising:

a first arm arranged between the first fork and the second fork, the first arm being separate from and extending substantially parallel to the first fork of the material handling vehicle;

a second arm arranged between the first fork and the second fork, the second arm opposite the first arm, separate from and extending substantially parallel to the second fork of the material handling vehicle;

a support extending between the first arm and the second arm, the support coupled to the material handling vehicle between the first fork and the second fork;

a first sensor positioned within the first arm, the first sensor to indicate a load is present in a first load position on the material handling vehicle; and a second sensor positioned within the second arm; the second sensor to indicate a load is present in a second load position on the material handling vehicle.

15. The system of claim 14, wherein the first sensor and the second sensor each include:

a transmitter, the transmitter to transmit a beam between the first arm and the second arm; and a receiver to receive the beam from the transmitter.

16. The system of claim 15, wherein the load position verification system indicates that no load is on the material handling vehicle when the beam between the transmitter and the receiver of both the first and second sensors is unbroken.

17. The system of claim 15, wherein the load position verification system indicates that the load is in a first load position on the material handling vehicle when the beam between the transmitter and the receiver of the first sensor is broken and the beam between the transmitter and receiver of the second sensor is unbroken.

18. The system of claim 15, wherein the load position verification system indicates that the load is in a second load position on the material handling vehicle when the beam between the transmitter and the receiver of both the first and second sensors is broken.

19. The system of claim 15, wherein the load position verification system generates a fault signal when the beam between the transmitter and the receiver of the first sensor is unbroken and the beam between the transmitter and the receiver of the second sensor is broken.

* * * * *